May 8, 1951 J. H. JOHANSEN 2,551,840
BELT CONVEYER
Filed Sept. 28, 1948
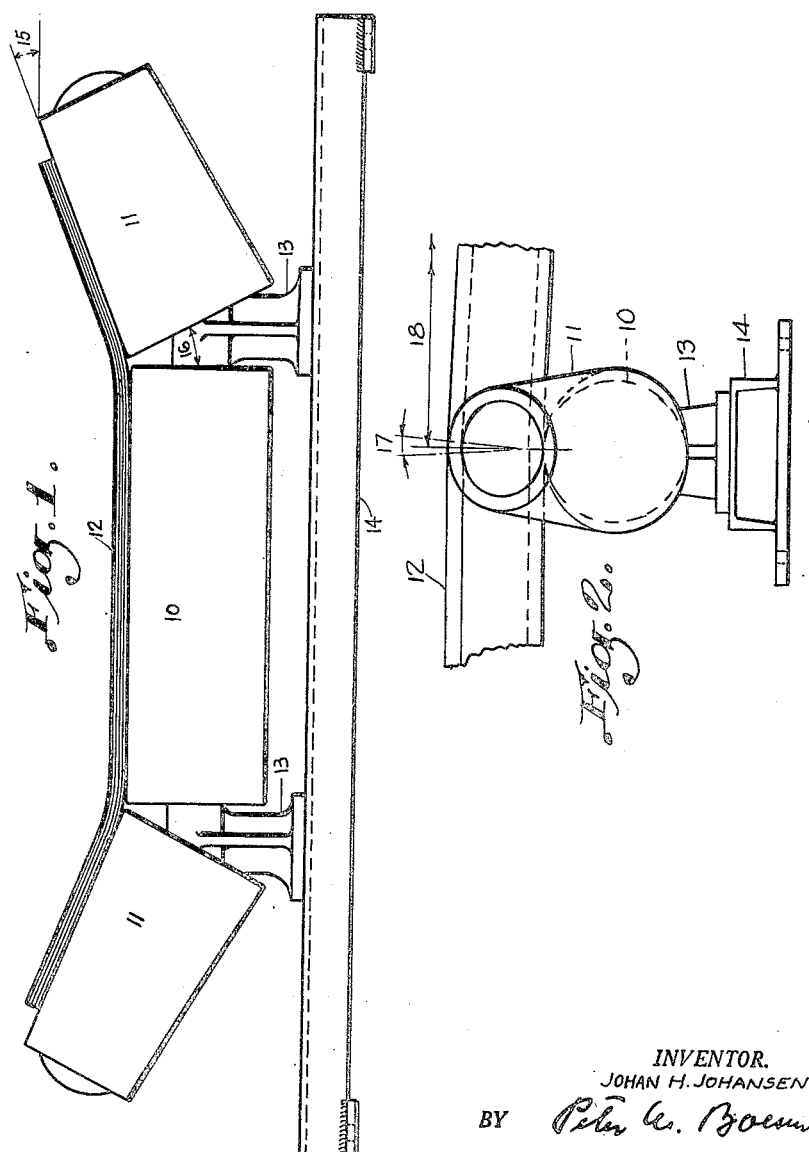
INVENTOR.
JOHAN H. JOHANSEN
BY
ATTORNEY.

% Patented May 8, 1951

UNITED STATES PATENT OFFICE 2,551,840

BELT CONVEYER

Johan H. Johansen, Great Kills, N. Y.

Application September 28, 1948, Serial No. 51,500

4 Claims. (Cl. 198—192)

This invention relates to new and useful improvements in belt conveyors, and it has for its purpose to provide a device of what is known as a "troughing idler," which is to be used on belt conveyors for handling, i. e., conveying bulk material.

The troughing idler is to be applied to the so called carrying run of belt conveyors for the purpose of supporting the belt and the load carried by the belt, and also in order to give the said belt a troughed cross sectional shape so as to increase its carrying capacity.

The troughing idler assembly is made up of several different parts, such as rollers (also called pulleys), shafts, supporting brackets, base, and other well known parts, not shown.

The conventional troughing idler, commonly used today, has three rollers of cylindrical form and of equal diametrical dimensions.

With the above and other objects in view, this invention consists of the novel features of construction, combination and arrangement of parts, hereinafter fully described, claimed and illustrated in the accompanying drawings forming part of this application, and in which similar characters of reference indicate corresponding parts in all views, and in which:

Figure 1 is a side elevational view of my invention; while

Figure 2 represents an end view of the troughing idler.

Referring more particularly to the drawing, the numeral 10 indicates the central roller and the numerals 11, 11 designate the two end rollers. The conveyor belt is identified by the numeral 12, while the supporting brackets are identified by the numerals 13, 13 and the base of the assembly is indicated by the numeral 14.

The angle, which the top side of the conical end roller 11 describes with the horizontal plane is indicated by the numeral 15, and the opening, or angular gap, between the end of the central roller 10 and the large end of the conical end roller 11 is designated by the numeral 16. The angular contact between the belt and the conical end roller is indicated by the numeral 17.

It will be noted from the drawing, that my invention also makes use of three rollers, one of which, the central roller 10, is cylindrical in shape, while the two end rollers 11, 11 are of a conical shape.

As will be seen from the drawing the central roller 10 is mounted with its longitudinal axis in a horizontal position, while the two conical end rollers 11, 11 are placed with their longitudinal axes in alignment with the axis of the central roller 10 and with each other in the vertical plane but at an inclination with the horizontal plane at such an angle, that the top side of each of these conical end rollers 11, 11 will be placed at the desired angle shown at 15 with the horizontal plane.

As may be noted from the drawing, the large end of each of the conical end rollers 11 is placed next to, or adjacent to, the end of the cylindrical central roller 10, while the smaller end of each of the conical end rollers 11 is placed farthest away from the end of the central roller 10.

From the results obtained due to experiments made over a long period of time it has been found that there are several advantages to be gained by using conical end rollers in the idler assembly in such a combination as shown in my drawing and described herein.

One advantage is the large angular gap, or opening, 16 obtained between the end of the central roller 10 and the large end of the conical end roller 11 due to the greater angle which results from the use of conical end rollers.

This large angular gap permits the use of large and sturdy supporting brackets 13 at these points.

Another advantage directly resulting from the large gap 16 between the adjacent ends of the rollers 10 and 11 (permitting the use of large supporting brackets at these points), is that my idler is peculiarly adapted to the use of only two supporting brackets, 13 as shown.

A further advantage to be gained by using conical end rollers is the guiding, or trimming, action these rollers will impart to the conveyor belt.

Due to the very slight sag of the conveyor belt between the troughing idlers, the spacing 18 of which may vary according to conditions, the belt will describe a small angular contact with the conical surface of each end roller, and this angular contact, repeated on each idler and multiplied by the number of troughing idlers in place on the conveyor, will result, when the belt is in motion, in the aforementioned guiding or trimming action, causing the belt to stay lined up squarely with its longitudinal axis at right angles to the longitudinal axis of the troughing idler.

In other words, the troughing idler, as shown in the drawing and described herein, having conical end rollers, will have the same effect on the belt as that of a crown faced pulley.

The present practice for guiding conveyor belts is to use so called guide idlers spaced at certain intervals, or where it may be found necessary, on the conveyor. These guide idlers are of different design but mostly of the self-aligning swivel type, and having vertical side rollers against which the edge of the conveyor belt will rub when getting out of line and off center.

Another type of guide idler is a plain cylindrical roller mounted with its cylindrical axis vertically at the edge of the conveyor belt. If the conveyor belt runs off center its edge will contact the side roller and be prevented from going any farther.

My invention has the added advantage of making guide idlers, guide rollers and other mechanical means for guiding the conveyor belt, unnecessary; this will in itself constitute a saving in conveyor construction, while at the same time the objectionable rub and wear that takes place on the edges of the conveyor belt, when its edges rub against the side rollers of the conventional guide idler, is eliminated.

It is obvious that slight changes may be made in the form, construction, proportionate size of the different parts and arrangements, as shown within the scope of the appended claims, without departing from the spirit of the invention, and I do not, therefore, wish to limit myself to the exact construction and arrangement shown and described herein.

When for instance the term conical is used to describe the shape of the two end rollers 11, it should be understood that this does not necessarily mean a true cone, but rather the frustrum of a cone.

It should also be understood that my idler may also be used with four supporting brackets, one bracket at the small end of each conical end roller, as well as the two brackets shown in the drawing.

In the arrangement shown in the drawing, it is intended to use so called "dead shafts," that is the shafts are to be fixed and stationary, while the rollers are free to rotate on bearings mounted on said shafts.

If four supporting brackets are used, the shafts on which the rollers are mounted may be either the "dead type" as described above or the so called "live shaft" type. In any case the bearings to be used may be either plain brass bushed or babbitted type, or of the antifriction type, such as ball or roller bearings.

The base for supporting the idler assembly may also be of a different design and adapted to its specific conditions.

What I claim as new, and desire to secure by Letters Patent of the United States, is:

1. A belt conveyor troughing idler having three idler rollers adapted for supporting, troughing and guiding conveyor belts, brackets supporting said three rollers upon a common base, the central roller being of a cylindrical shape, and the two end rollers of a conical shape, said central roller being mounted with its longitudinal axis in horizontal position, the two conical end rollers being mounted with their longitudinal axes in alignment with the longitudinal axis of the central roller, and with each other in a vertical plane and at an inclination with the horizontal plane, whereby to obtain a desired angle between the top side of each of the conical end rollers and the horizontal plane, the said two conical end rollers being placed with their bases adjacent the ends of the central roller, said rollers being free to rotate around their longitudinal axes, but restrained from moving endwise.

2. A belt conveyor troughing idler, said idler having three idler rollers, one a central roller being of a cylindrical shape, and two end rollers being inclined and of a conical shape, said latter rollers having the large ends of each positioned adjacent the ends of the central roller, and having their longitudinal axes in alignment with the longitudinal axis of said central roller in a vertical plane, but at an inclination with the horizontal plane, whereby to obtain large angular gaps between the adjacent ends of the three rollers.

3. A belt conveyor troughing idler having three rollers, the central roller being of a cylindrical shape, and the two end rollers of a conical shape, said rollers being mounted with the large ends of the conical end rollers adjacent the ends of the central roller, whereby to obtain an assembly, the outline of which, when looking at right angles to the longitudinal axis of said assembly, would in effect approximate that of a crown faced pulley, thereby giving the troughing idler the required ability to guide and train the conveyor belt.

4. A belt conveyor troughing idler having three rollers, the central roller being cylindrical, the two end rollers being conical of shape and having their ends mounted with their longitudinal axes in alignment with the longitudinal axis of said central roller in a vertical plane, and at an inclination with the horizontal plane, and having their large ends adjacent the ends of the central roller, whereby large angular gaps are obtained between the ends of the rollers, and an all-purpose troughing idler obtained for supporting the conveyor belt, guiding, or training said belt, and being especially adapted for use with only two supporting brackets.

JOHAN H. JOHANSEN.

REFERENCES CITED

The following references are of record in the file of this patent:

UNITED STATES PATENTS

| Number | Name | Date |
|---|---|---|
| 499,472 | Robins | June 13, 1893 |
| 710,936 | Bacon | Oct. 14, 1902 |
| 728,005 | Plummer | May 12, 1903 |
| 1,705,558 | Cuddihy | Mar. 19, 1929 |